United States Patent
Lin et al.

(10) Patent No.: US 11,675,321 B2
(45) Date of Patent: Jun. 13, 2023

(54) SIMULATION CONTROL SYSTEM AND SIMULATION CONTROL METHOD

(71) Applicant: Ardomus Networks Corporation, Hsinchu (TW)

(72) Inventors: Chin-Ru Lin, Hsinchu (TW); Peng-Jen Lu, Hsinchu (TW); Chen Ju Lai, Hsinchu (TW)

(73) Assignee: ARDOMUS NETWORKS CORPORATION, Hsinchu (TW)

( * ) Notice: Subject to any disclaimer, the term of this patent is extended or adjusted under 35 U.S.C. 154(b) by 0 days.

(21) Appl. No.: 17/378,777

(22) Filed: Jul. 19, 2021

(65) Prior Publication Data

US 2022/0137566 A1    May 5, 2022

(30) Foreign Application Priority Data

Nov. 5, 2020  (TW) ................... 109138680

(51) Int. Cl.
  *G05B 13/04*   (2006.01)
  *G06F 3/04847*  (2022.01)

(52) U.S. Cl.
  CPC ....... *G05B 13/042* (2013.01); *G06F 3/04847* (2013.01)

(58) Field of Classification Search
  CPC .............. G05B 13/042; G05B 19/0426; G05B 2219/23258; G06F 3/04847
  See application file for complete search history.

(56) References Cited

U.S. PATENT DOCUMENTS

| 2003/0132973 A1* | 7/2003 | Hughes ............... G06F 3/04815 715/850 |
| 2013/0117673 A1* | 5/2013 | Hatambeiki ....... H04N 21/8186 715/733 |
| 2019/0199772 A1* | 6/2019 | Pennarun ................ H04L 65/80 |

OTHER PUBLICATIONS

Leeb et al.; A Configuration Tool for HOmeNet; Aug. 1996; IEEE Tranactions on Consumer Electronics, vol. 42, ssue 3; pp. 387-394. (Year: 1996).*

* cited by examiner

*Primary Examiner* — Jennifer N Welch
*Assistant Examiner* — Ashley M Fortino
(74) *Attorney, Agent, or Firm* — Tomanageip

(57) ABSTRACT

A control simulation system, includes: a transceiving interface, transceiving attribute information of a device; an identification unit, comparing the object simulation model with the attribute information of the external device, for determining an object simulation model corresponding to the external device by an specific mapping arrangement; and an user interface, for providing a model interface unit corresponding to the object simulation model for flexibly combining the object simulation model with an control icon or an physical movable control element. The model interface unit is displayed on the user interface, and the control icon or the physical movable control element, corresponds to a control command or a control structure of the external device for controlling the external device.

13 Claims, 9 Drawing Sheets

SIMULATION CONTROL SYSTEM AND SIMULATION CONTROL METHOD

CROSS REFERENCE

The present invention claims priority to TW109138680 filed on Nov. 5, 2020.

BACKGROUND OF THE INVENTION

Field of Invention

The present invention relates to a control simulation system. In particular, the present invention relates to a control simulation system for remotely controlling an external device through an object simulation model which can be flexibly combined with a control icon or a physical movable control element.

Description of Related Art

The prior control systems are generally required to communicate with the external devices in the same protocol, such that the attribute information of the external devices can be properly obtained. The attribute information belongs to each external device, which includes the performance parameters and the control parameters. However, during the development of science and technology, industry needs, or national technology trends, there are many communication protocols active in the current market, such that a variety of products often have to communicate between multiple communication protocols. The prior solution is to detect and select the same communication protocol used in the external device from multiple communication protocols, but it usually cannot be used for direct communication between different protocols. The prior processing method for the direct communication between different protocols is complicated, and the conventional control system even needs to run a conversion process through several communication protocols to obtain the required information. Therefore, the prior control system is very inconvenient and complicated, and the attribute information is easy to be distorted.

In view of the above, on the needs of external devices with multiple communication protocols, it is necessary to have a systematic technology that can effectively and easily communicate across multiple protocols, easily and correctly identify device operations, flexibly configure the devices, and quickly and flexibly perform various manipulations and signal conversions.

SUMMARY OF THE INVENTION

According to the aforementioned requirements, the present invention provides a control simulation system that has functions of identification capability and communication between different protocols. This system includes: a transceiving interface for transceiving (sending and receiving) attribute information of at least one external device; an identification unit, configured to compare multiple object simulation models in the control simulation system, for determining the object simulation model corresponding to at least one external device based on the attribute information of the external device by an specific mapping arrangement; and an user interface, displaying at least one model interface unit corresponding to the at least one object simulation model in the user interface, wherein the at least one model interface unit is formed by flexibly combining the object simulation model with at least one control icon or at least one physical movable control, wherein the at least one control icon or the at least one physical movable control element (tangible movable control element) of the at least one object simulation model, corresponds to at least one control command or at least one control structure of the external device, for controlling the external device.

In one embodiment, the step of flexibly combining the at least one object simulation model with at least one control icon or at least one physical movable control element to form the at least one model interface unit, includes manual selection of the control icon or the physical movable control element by the user, or includes systematically automatic selection of the control icon or the physical movable control element, to form a model interface unit corresponding to this object simulation model. In one embodiment, the specific mapping arrangement can be a mapping relation between the object simulation models and the external devices, based on the features of the external devices, such as the performance parameters, the control parameters, input parameters, output parameters, etc.

The objectives, technical details, features, and effects of the present invention will be better understood with regard to the detailed description of the embodiments below, with reference to the attached drawings.

DESCRIPTION OF THE PREFERRED EMBODIMENTS

Figure 1:
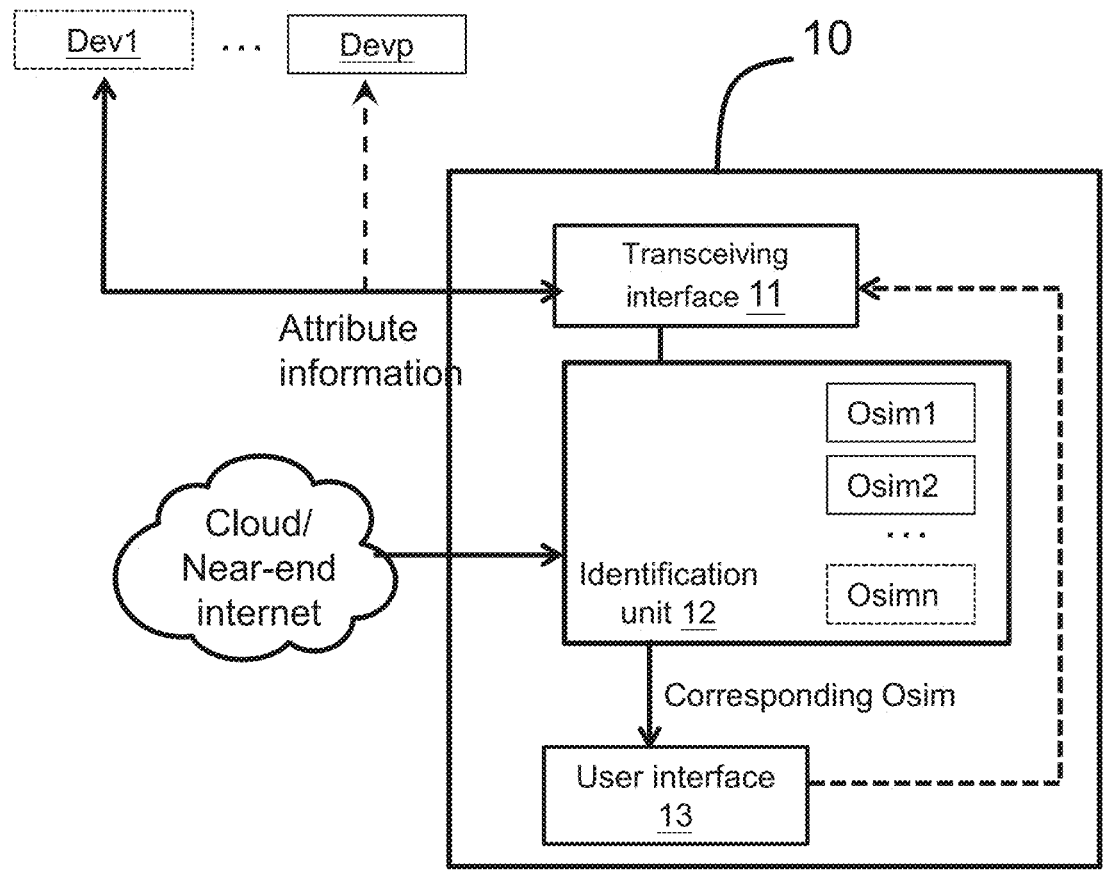
FIGS. 1 and 1A show schematic diagrams of the control simulation system according to various embodiments of the present invention.
Figure 1A:
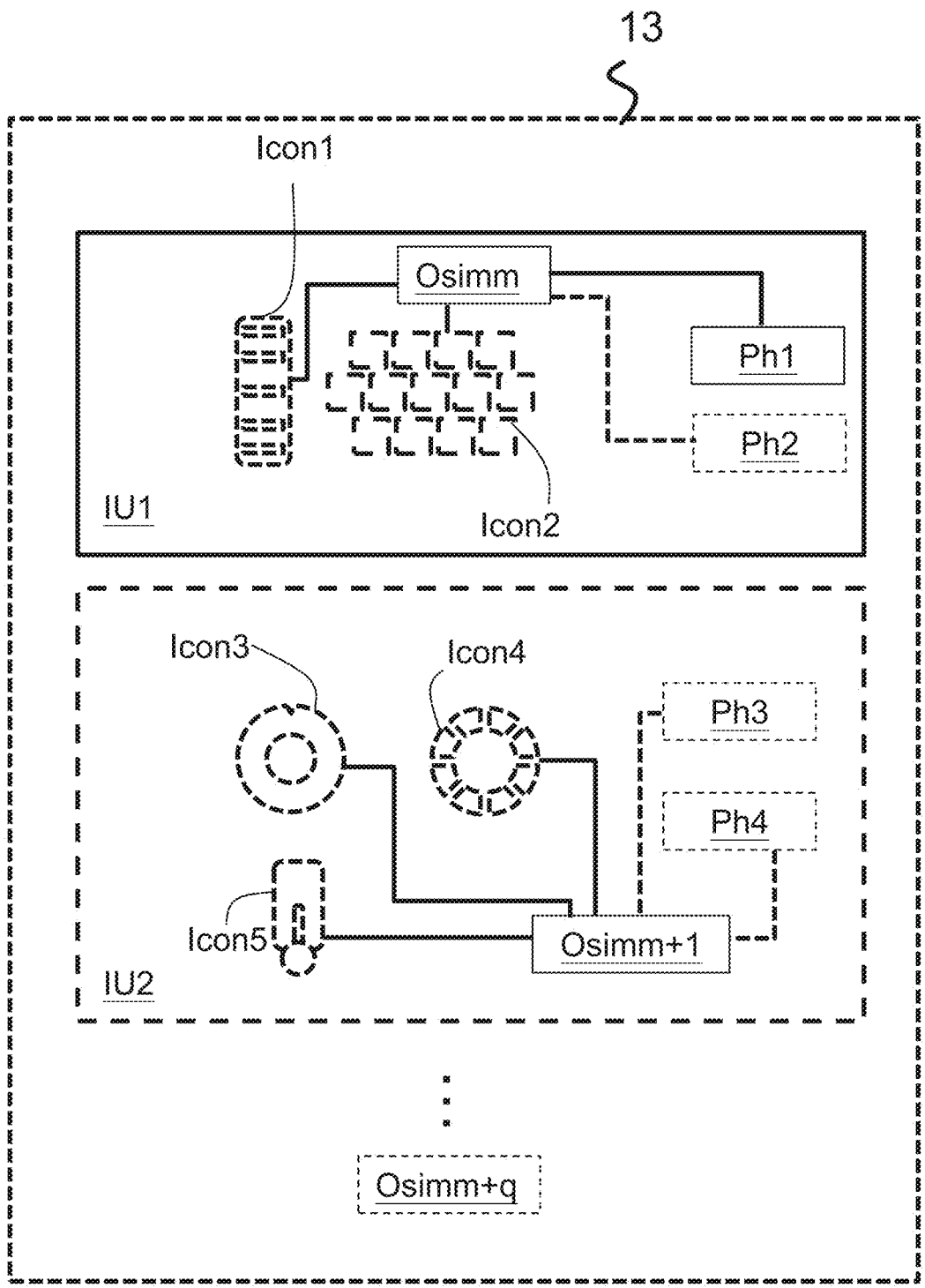

As shown in FIG. 1, a schematic diagram of a control simulation system 10 is shown according to one perspective of the present invention, which has the benefits of communication between different protocols, easy operation identification and, and flexible configuration. The control simulation system 10 includes: a transceiving interface 11, transceiving attribute information of at least one external device Dev1; an identification unit 12, including multiple object simulation models Osim1 ... Osimn, and determining the object simulation model corresponding to each of the at least one external device according to the attribute information of the at least one external device (for example, the attribute information of the external device Dev1 corresponds to object simulation model Osimm, FIG. 1A); and an user interface 13, which can have at least one physical movable control element Ph1 (as shown in FIG. 1A), or display a model interface unit IU1 having the object simulation model (such as Osimm) corresponding to each external device (such as Dev1), at least one control icon (such as Icon1, Icon2, as shown in FIG. 1A), and at least one physical movable control element (such as Ph1, as shown in FIG. 1A). Each control icon (Icon1, Icon2) or at least one physical movable control element (such as Ph1) corresponds to at least one control command or at least one control structure of the external device (such as Dev1). The control command and the control structure can be flexibly combined in the model interface unit for controlling the operation of an external device (such as Dev1). The model interface unit IU1 can be formed after this flexible combination. It can include automatic combination by the system or manual combination by the user to form the model interface unit IU1 corresponding to this object simulation model Osimm.

The transceiving interface 11 and the external device Dev1 are respectively independent and separated. The model interface unit IU1 controls the control icon (Icon1, Icon2) in the FIG. 1A is for illustrative purposes, which are not intended to limit the number nor type of control icons in the model interface unit IU1. For example, the model interface unit IU1 includes a control icon Icon1 and a physical movable control element Ph1 related to the external device Dev1; or, the model interface unit IU1 does not include any control icon for the external device Dev1, but two physical movable control elements Ph1 and Ph2; or, the model interface unit IU1 includes other control icons and another combination of types and numbers of the physical movable control elements for the external device Dev1. If necessary, the model interface unit IU1 may also include other actuating devices or sensing devices, such as cameras, microphones, or speakers. Please refer to the description of other embodiments for the details.

In one embodiment, the object simulation model Osimm in the user interface 13, illustrates the mth object simulation model of object simulation model Osim1 . . . Osimn in the identification unit 12, where 1≤m≤n. The priority of aforementioned physical movable control element Ph1, or a combination priority of Ph1 and Ph2, which are only examples to illustrate one physical movable control element Ph1 or two physical movable control element Ph1 and Ph2, and can be not limited to the outlooking sequence, category sequence, or sequence numbers in the corresponding database in the transceiving interface 11. If necessary, more than two physical movable control elements can be combined to the same object simulation model. In one embodiment, the user interface 13 in FIG. 1A includes another object simulation model Osimm+1 to create another model interface unit IU2. In one embodiment, the user interface in FIG. 1A accepts multiple object simulation models (Osimm to Osimm+q), such that the user interface 13 can include more than one object simulation model based on different corresponding external devices. These object simulation models can be flexibly combined with the control icon(s) or the physical movable control element(s) to form a model interface unit for connecting and controlling the corresponding external devices by the control icon(s) or the physical movable control element(s).

The identification unit 12 includes a plurality of object simulation models Osim1 . . . Osimn, which can respectively correspond to external devices Dev1 . . . Devp of different types, brands, functions, or communication protocols (for example, IoT protocols). One purpose of this arrangement is to control external devices (such as Dev1 . . . Devp) of different types, brands, functions, or communication protocols on the same user interface 13 (FIG. 1A). In one embodiment, a manual operation on the control icon on the user interface 13, through the transceiving interface 11, can control at least one external device (such as Dev1). That is, the user can manipulate the external device (e.g. Dev1) by manually operating the control icons (such as Icon1, Icon2) or physical movable control element (such as Ph1) on the user interface 13, to control at least one external device through the transceiving interface 11.

Regarding of the communication protocol, the identification unit 12 can determine each external device (for example, Dev1 . . . Devp) based on the attribute information, such as in the application layer in the Internet of Things (IOT) system. For example, the identification unit 12 determines the corresponding type of the external device (Dev1 . . . Devp) as, such as, an environmental monitoring device, a wireless sensing network, or an energy management device, based on the attribute information of an environmental monitoring information, a wireless sensing network information, or an energy management information. After confirming the type of the external device, the identification unit 12 then determines and forms an object simulation model corresponding to the external device. According to the present invention, the identification unit 12 can further determine the required information of the external device, based on, such as, an information from the perception layer or network layer of the external device (for example, Dev1 . . . Devp) in the Internet of Things (IoT) system.

According to the present invention, the control simulation system 10 can also detect or determine the communication protocols used in the external devices (such as Dev1 . . . Devp), then choosing or setting one of them as the internal system protocol for the control simulation system 10. The choice of the internal system protocol of this system can be based on the factors of, such as, the communication protocol mostly used in the external devices (such as Dev1 . . . Devp), or the communication protocol used by the main external device (such as the mainly controlled external device). In this way, it can solve the problems caused by complicated conversion between the variety of communication protocols in the previous technology, and by large amount of different information sent and received through the transceiving interface 11. Thus, the present control simulation system 10 can be much more effective, and the information generated by internal operations can also be directly transmitted through the transceiving interface 11, to reduce the possibility of errors happened during converting communication protocols.

In FIG. 1, the identification unit 12 can also determine the object simulation model corresponding to the external device (such as Dev1 . . . Devp) based on the database in the cloud or near-end network. In this way, the amount of data stored in the local identification unit 12 can be greatly downsized, and achieve a great cost reduction. A system administrator can directly and flexibly update the external device attribute information without sending technical persons for serving the user side, each control simulation system can be updated synchronously without extra manpower needed. When the control simulation system 10 starts, it can automatically identify and select the most suitable object simulation model, which can be not limited to the object simulation models stored in the identification unit 12 (that is, not limited to Osim1 . . . Osimn) and their defined functions, but from the database in the cloud or near-end network.

FIG. 1A shows one embodiment, wherein the aforementioned control icon, such as the knob icon Icon1, the button icon (or keyboard icon) Icon2 in the object simulation model Osimm, the dial icon Icon3, the direction key icon Icon4, the lever icon Icon5, or the data input icon, etc. in the object simulation model Osimm+1, which are displayed on the user interface 13 (such as touch screen, electronic whiteboard, or other handheld electronic device) for easy manual control. These control icons can correspond to the physical movable control element on the external device, such as levers, knobs, data input mechanism, buttons, direction keys, dial mechanism, etc. The selection of the control icon can be determined according to the control function. For example, a dial can be used for control with periodic function, and a lever or knob can be used for intensity control. As mentioned above, the control means can be not limited to the control icon on the user interface, but can also be physical structure that users (such as visually disabled users) can perform physically movable control. The user interface 13 can include at least one of the physical movable control element Ph1, Ph2, Ph3, Ph4 . . . Pho (that is, the control structure is a physical structure, for allowing the user to rotate, press, stretch and other hand manipulation) to correspond to at least one control command or at least one control structure, such as a physical lever, a physical knob, a physical data input interface, a physical button, a physical direction key, or a physical dial. These physical movable control elements can also have protrusions, depressions, or buttons that can change shape and position under a touch or a movement. Or, when the operations of these control icons are performed, the user interface 13 can synchronously generate a reminding sound to remind the visually disabled user about the current control operation.

Importantly, the object simulation models Osimm, Osimm+1 and physical movable control elements Ph1, Ph2, Ph3, Ph4 . . . Pho in FIG. 1A are only examples for illustrating technical features of the present invention and not to limit the implementation of the present invention. The users can modify some technical features or unit quantities according to their needs, such as reducing object simulation models, control icons or physical movable control elements; or adding other object simulation models, control icons or physical movable control elements. Such as, camera, microphone or speaker, etc. All of these modifications are still within the spirit of the present invention.

According to the present invention, in order to facilitate the operation by the visually disabled users, touch on the control icon method can still work except the aforementioned physical movable control element. When a user (such as a visually disabled user, etc.) is using the system, the user interface can provide voice instructions by a speaker. For example, guiding the user to move the finger to the control icon or physical movable control element, and explaining the type of control icon or the simple operation instructions of physical movable control element. The voice can be a feedback the operation of the user, to help the visually disable user understand the current operation status during the operation.

Figure 2A:
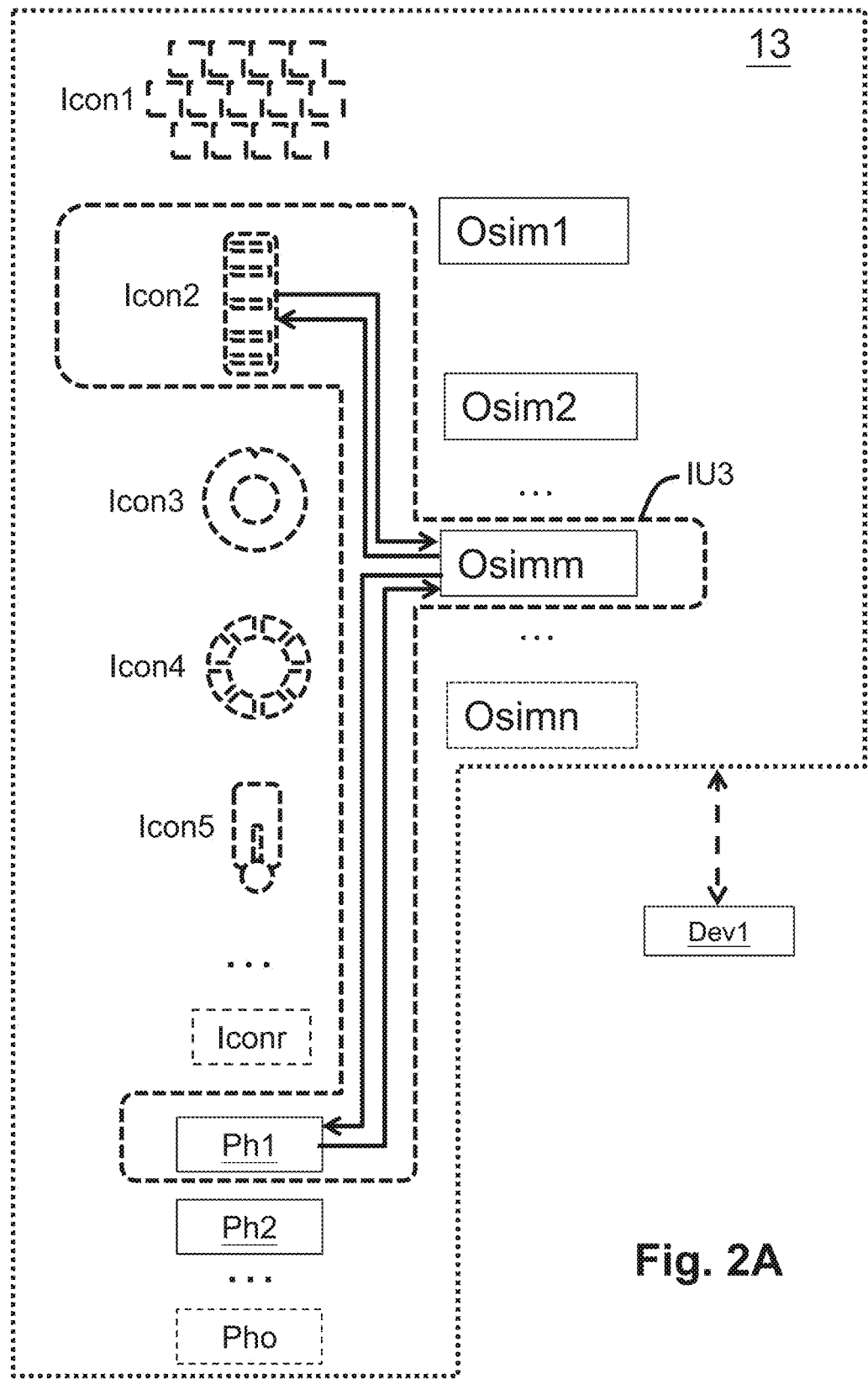
FIGS. 2A to 2E show schematic diagrams of flexible configuration in the user interface according to various embodiments of the present invention.
Figure 2B:
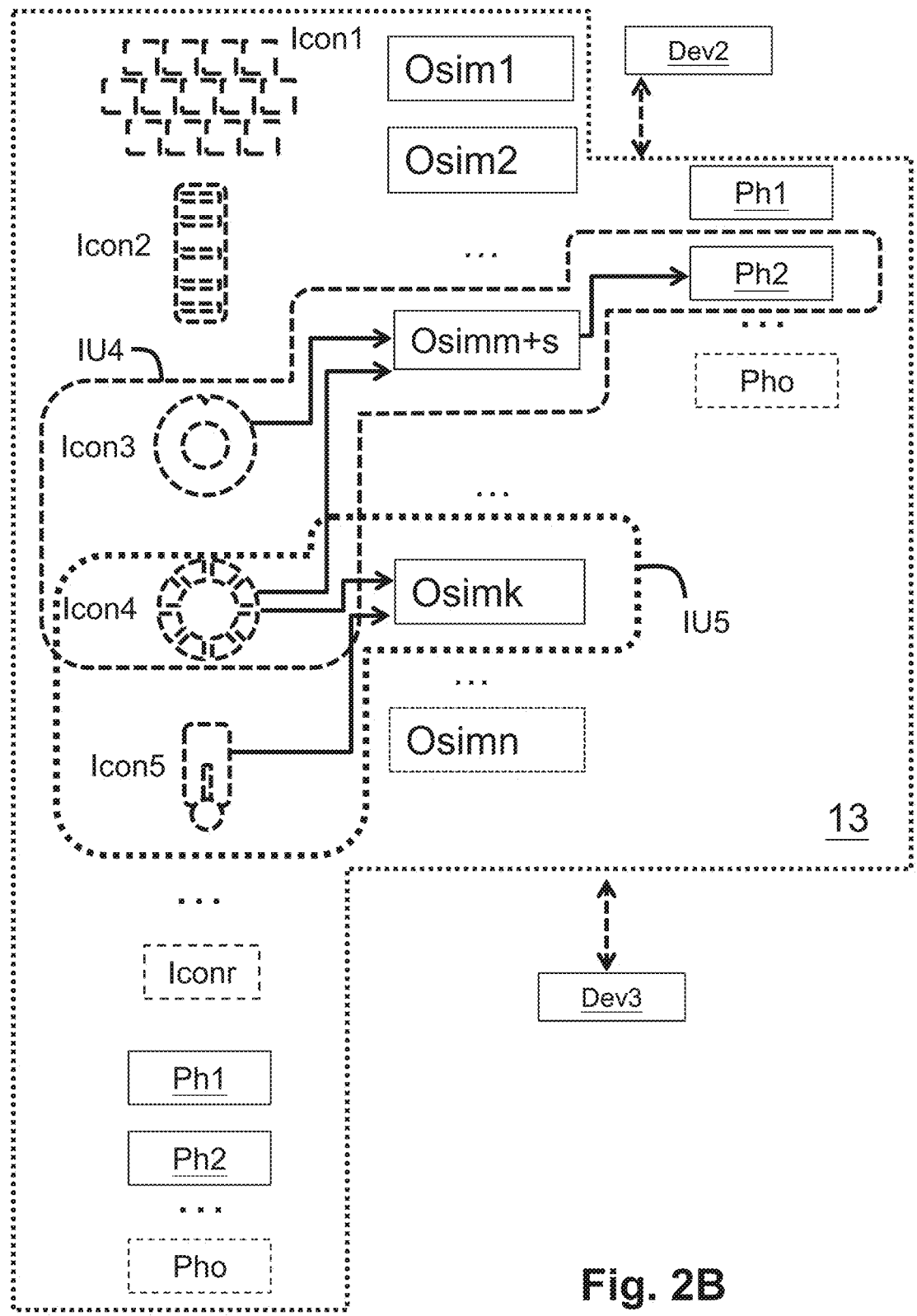
Figure 2C:
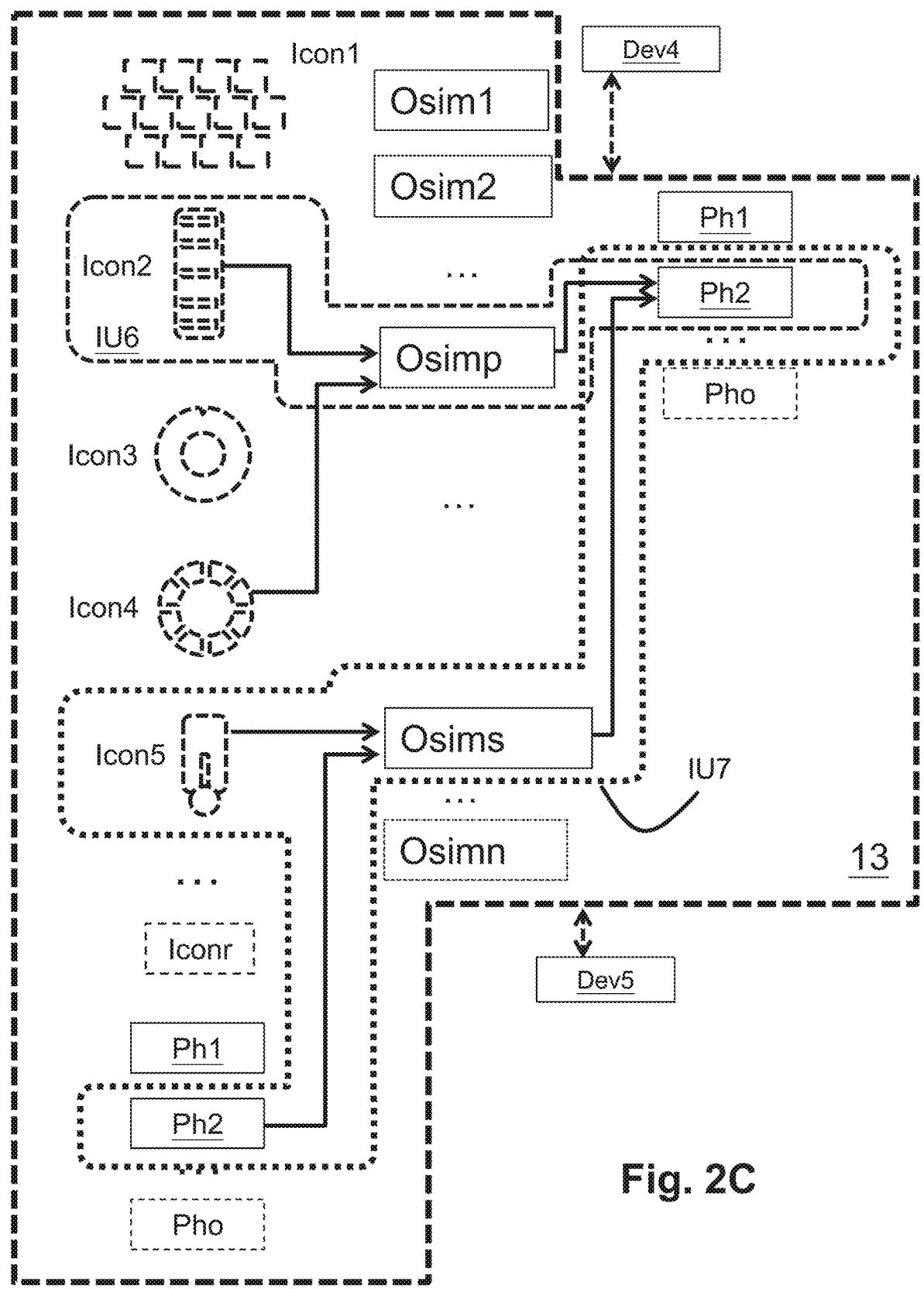
Figure 2D:
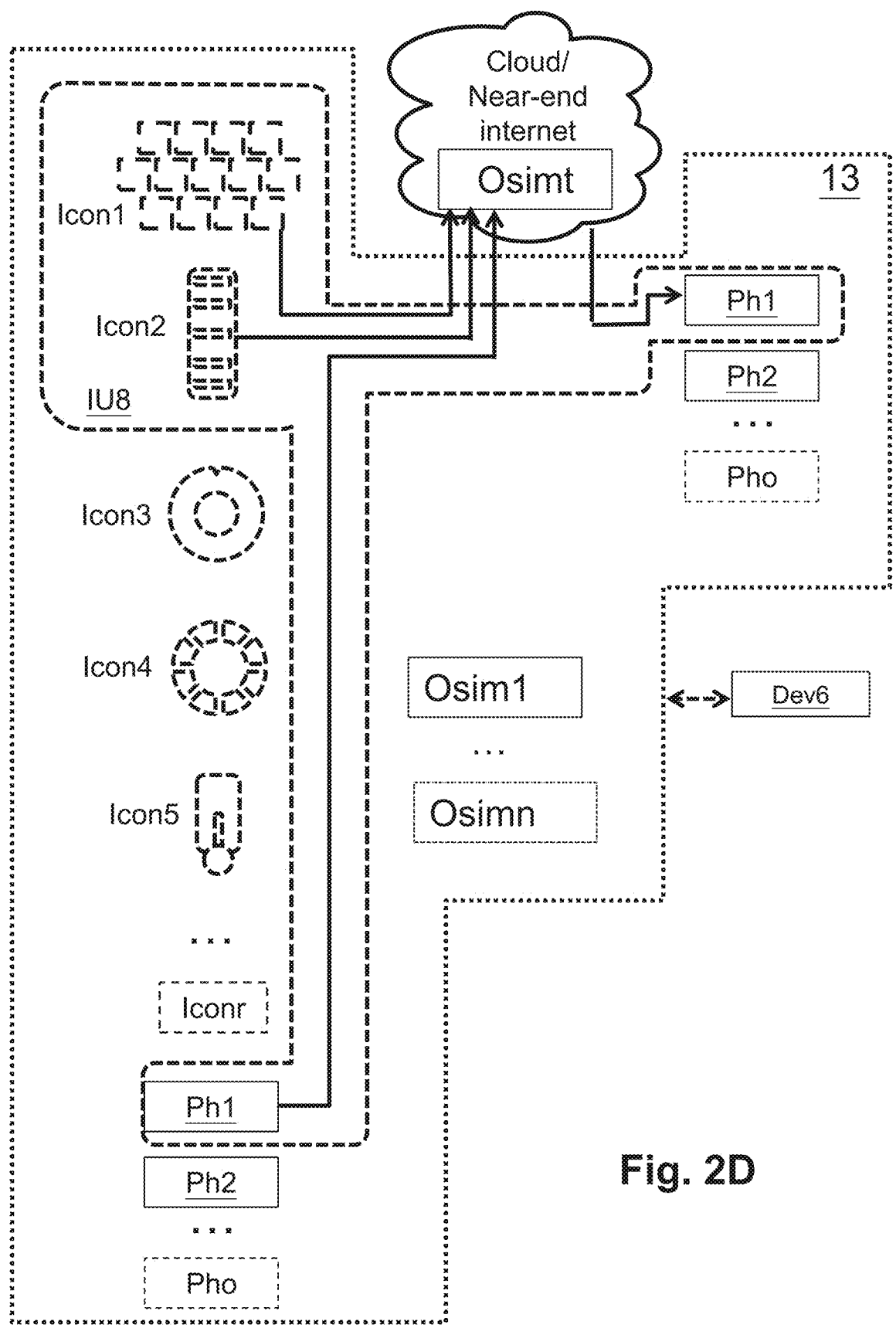
Figure 2E:
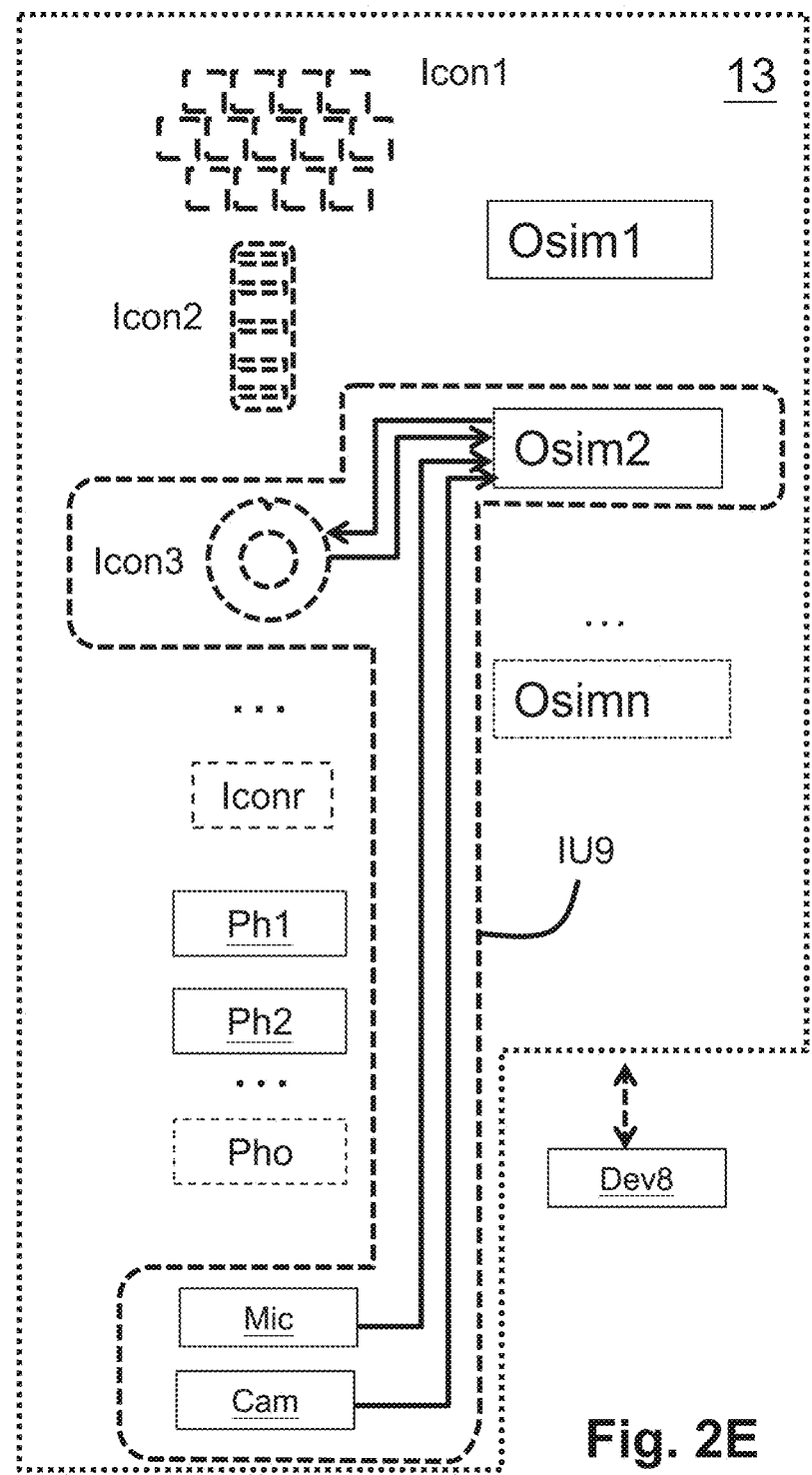

Through FIGS. 2A to 2E, several embodiments of the present invention are shown therein, which illustrate exemplary schematic diagrams of the flexible configuration of the model interface unit in the user interface 13. In FIG. 2A, the external device Dev1 has a corresponding object simulation model Osimm, and the model interface unit IU3 is configured with the control icon Icon2 and the physical movable control element Ph1. The solid line arrows showing directions from right to left, mean that the control icon Icon2 and the physical movable control element Ph1 can provide the function of sensing the operation or status of the external device Dev1, and the solid line arrows from left to right mean that the control icon Icon2 and the physical movable control element Ph1 can provide actuation functions to control external device Dev1. The model interface unit IU3 can interact with the external device Dev1 based on these functions. FIG. 2B shows the model interface units IU4 and IU5 corresponding to two external devices Dev2 and Dev3. The model interface units IU4 and IU5 correspond to different object simulation model Osimm+s and Osimk, wherein the model interface units IU4 and IU5 can be configured to include the same control icon Icon4. FIG. 2B shows the two external devices Dev2, Dev3, control icons Icon3, Icon4, Icon5, and physical movable control element Ph2, wherein the solid line arrows in between them means the signal transmission flows. Arrows to the object simulation model Osimm+s, Osimk means the sensing signal, and arrows from the object simulation model Osimm+s and Osimk means actuating signals. The model interface units IU6 and IU7 in FIG. 2C, can be configured to include the same actuation function of the same physical movable control element Ph2. In FIG. 2D, the model interface unit IU8 does not display object simulation model Osimt, because object simulation model Osimt is in the cloud or a near-end internet. If necessary, any one of the aforementioned model interface units IU1 to IU7 may not display the related object simulation model(s), such that the user interface 13 can be displayed concisely. Or, one of the model interface units IU1 to IU8 without displaying the related object simulation model can be illustrated by naming, model type, color, shape, sound, background, icon, trademarks, etc., for identifying the corresponding external device. The object simulation model Osim2 configured in the model interface unit IU9 in FIG. 2E is not only connected to the control icon Icon3, but also can be connected to other devices, such as camera Cam, microphone Mic, speaker, etc.

Therefore, in the present invention, the configuration of the model interface unit is highly flexible and adaptive, wherein the user or the system can adjust the objects and their function definitions in the model interface unit as needed. Further, different model interface units can also have shared objects to effectively utilize the computing resources.

Figure 3:
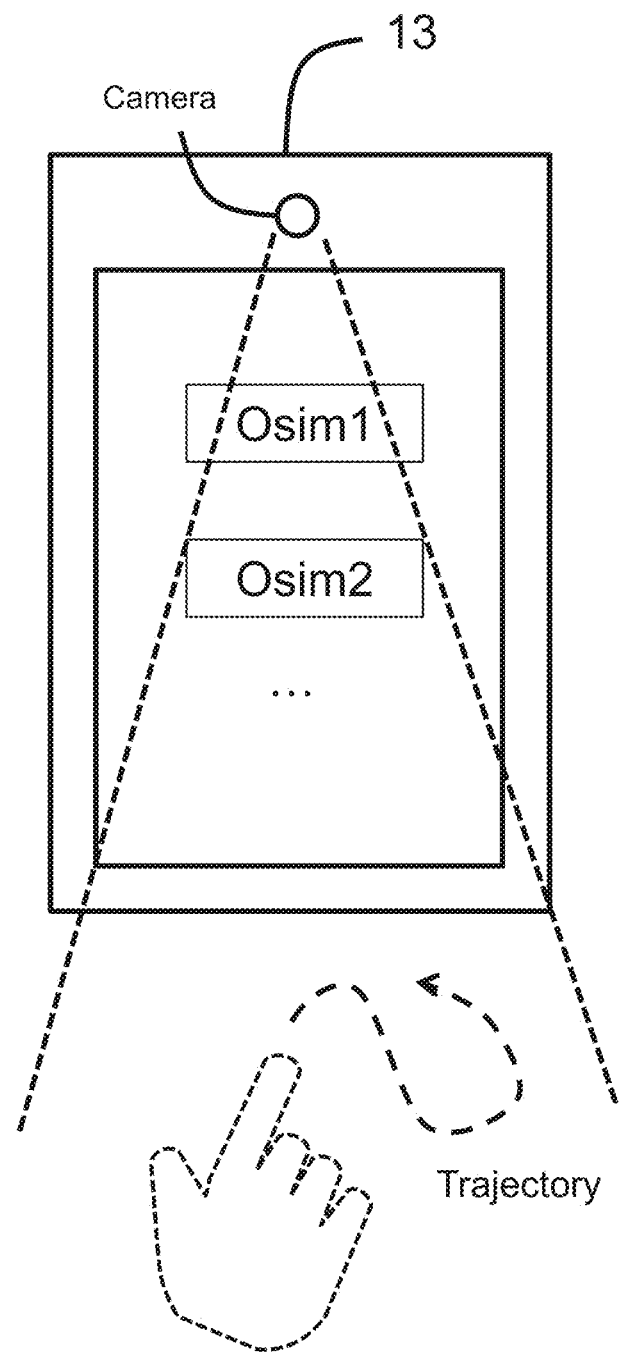
FIG. 3 shows a schematic diagram of the user interface according to one embodiment of the present invention.

In order to help the disabled users to operate the system, in one embodiment shown in FIG. 3, the user interface 13 may also include a camera. The user can use gestures (such as waving a hand in front of the camera). A special gesture trajectory can correspond to object simulation model, control command, or control icon, and the user interface 13 can accordingly activate the corresponding object simulation model, control command, control the control icon based on this special gesture trajectory, or operate on the object simulation model. It can address the issue of how to find the object simulation model and the control icon by the visually disabled users.

When the user starts to learn how to use the system of the present invention, or forgets how to operate the control simulation system, the present invention further provides a practice mode for helping the users to become familiar with the user interface and the control simulation system 10. The user interface 13 in this practice mode provides a practice object model corresponding to a practice device and at least one control icon or physical movable control element for users to practice for familiarizing with control simulation system 10. In the practice mode, the practice device can be predetermined, and it is thus not necessary to determine the attribute information of the practice device by the identification unit 12. The practice object model can be predetermined in the system. In the practice mode of another embodiment, the practice object model can be determined by using an identification unit 12 to determine the attribute information of at least one practice device (for example, an external device to be operated), but the manual operation can operate not through the transceiving interface 11 to control this external device. One purpose of controlling an external device without using the transceiving interface 11 is to help the user to familiarize with this practice object model before officially controlling the external device. When the user becomes familiar with the control of the practice object model, the practice mode can be stopped.

In one embodiment, the attribute information of the external device includes the input parameters of the external device (for example, input parameters related to electrical energy, heat, mechanical energy, chemical energy, or other types of energy) and output parameters (for example, cooling temperature, electrical energy, thermal energy, mechanical energy, flow rate, speed, production, or other types of output parameters). The input parameters and output parameters of the external device have an effective performance range for the external devices. This effective performance range can be determined based on the historical records or predetermined ex-work input parameters and output parameters. This historical record is a record of multiple operations stored in the control simulation system, which generates the aforementioned effective performance range based on these manipulation records by analytical means (for example, statistical method, artificial intelligence, etc.). This effective performance range can be used in the aforementioned practice mode to tutor the users to operate therein. In normal control, the effective performance range also provides a reasonable control range for operation reference.

In comparison with the aforementioned effective performance range, in one embodiment, at least one parameter or a combination of parameters in the attribute information of the external device, has an ineffective performance range (for example, the ineffective performance range can be a range outside the effective performance range). When this parameter or this parameter combination is in the ineffective performance range, the user interface 13 sends out a warning message or suspends the operation of object simulation model (such as Osim1). For example, when the internal temperature or the rotation speed is too low or too high, the power consumption is too high, or the performance is too low, which are determined to be in the ineffective performance range, and the user interface 13 will issue a warning message or suspend the operation of object simulation model (such as Osim1).

According to the present invention, within the effective performance range, the user interface can have a preferred input range of the control icon in the object simulation model. For example, the preferred input range may have preferred input ranges for the control icons of the value, strength, position, or ruler, etc.

In one embodiment, the pressing touch on the control icon in the user interface, can be based on the centroid of the pressing range on the control icon, or a maximum pressure position on the control icon, etc.

Figure 4:
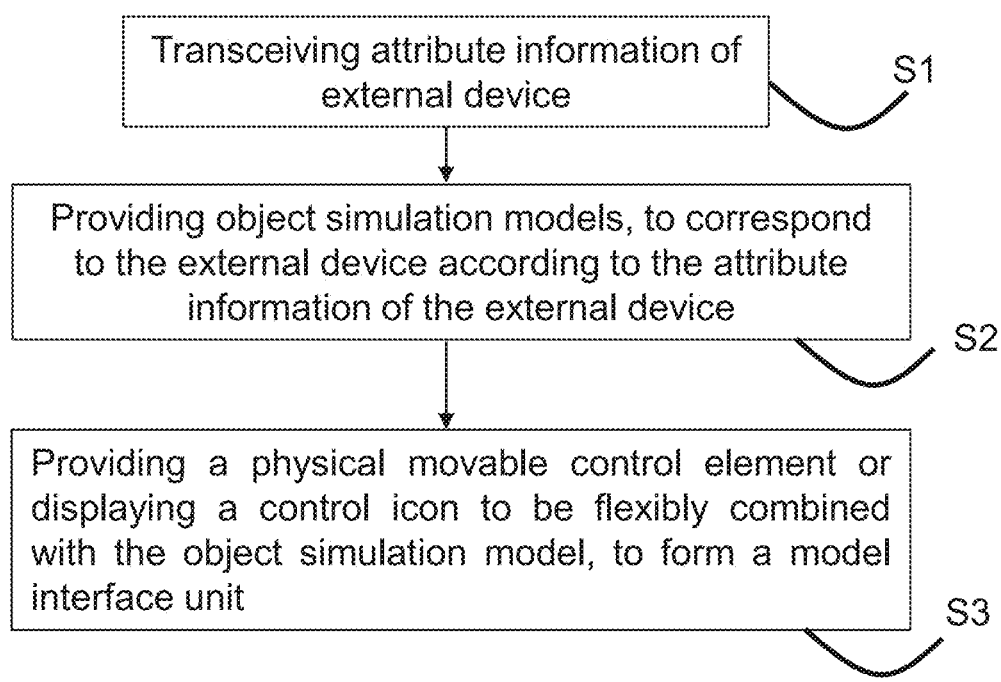
FIG. 4 shows a schematic flow chart of the control simulation method process according to one embodiment of the present invention.

Referring to FIG. 4, in one perspective, the present invention provides a control simulation method, which includes: transceiving attribute information of at least one external device (S1); providing a plurality of object simulation models, which are configured to correspond to the at least one external device according to the attribute information of the at least one external device (S2); and providing at least one physical movable control element or displaying at least one control icon to be flexibly combined with at least one of the object simulation model, to form a model interface unit (S3). Each control icon and at least one physical movable control element, respectively correspond to at least one control command and at least one control structure in the external device. The control command and the control structure can be used to control the operation of the external device. The detail related to the elements and their descriptions in each step, can be referred to the description of the aforementioned embodiments, which are not duplicated herein.

The present invention has been described in considerable detail with reference to certain preferred embodiments thereof. It should be understood that the description is for illustrative purpose, not for restricting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be understood as fall within the scope of the following claims and their equivalents.

What is claimed is:

1. A control simulation system, comprising:
a transceiving interface, transceiving attribute information of a plurality of external devices, wherein the transceiving interface and the plurality of external devices are respectively independent and separated;
a plurality of object simulation models, configured to correspond to the plurality of external devices according to the attribute information of the plurality of external devices, by a specific mapping arrangement, wherein the specific mapping arrangement includes that one of the attribute information of the plurality of external devices is chosen as a common attribute information for the plurality of external devices;
an identification unit, comparing the plurality of object simulation models with the attribute information of the plurality of external devices, for determining the plurality of object simulation models corresponding to the plurality of external devices by the specific mapping arrangement; and
an user interface, displaying a plurality of model interface units corresponding to the plurality of object simulation models, wherein the plurality of object simulation models are flexibly combined with at least one control icon or at least one physical movable control element to form the plurality of model interface units, wherein the at least one control icon and the at least one physical movable control element of the plurality of object simulation models, respectively corresponds to at least one control command and at least one control structure of the external devices, for controlling the external devices,
wherein the plurality of model interface units share the at least one control icon or the at least one physical movable control element as a common control icon or a common physical movable control element,
wherein the common control icon or the common physical movable control element is shared by at least two of the plurality of external devices.

2. The control simulation system of claim 1, wherein the plurality of external devices are configured to be controlled by a manual operation to the at least one control icon or the at least one physical movable control element in the user interface.

3. The control simulation system of claim 1, wherein the identification unit determines a type of the plurality of external devices by the attribute information of the at least one external device in the application layer in the internet of things (IOT).

4. The control simulation system of claim 1, wherein the control icon includes: a lever icon, a knob icon, a data input icon, a button icon, a direction key icon, or a dial icon.

5. The control simulation system of claim 1, wherein the at least one physical movable control element includes: a physical lever, a physical knob, a physical data input interface, a physical button, a physical direction key, or a physical dial.

6. The control simulation system of item 1, wherein the control simulation system provides a practice mode, wherein the user interface provides a practice object model corresponding to at least one practice device with at least one control icon, and the practice object model is not connected to the at least one practice device by the identification unit for determining the attribute information of the at least one practice device, nor controls the at least one practice device by a manual operation on the transceiving interface.

7. The control simulation system of claim 1, wherein the attribute information of the at least one external device includes communication protocols, input parameters or output parameters of the at least one external device, and there is an effective performance range of the input parameters or the output parameters, wherein the effective performance range is determined based on a historical record of the input parameters or the output parameters.

8. The control simulation system of claim 7, wherein in the attribute information of the at least one external device, the input parameters or output parameters of the at least one external device have an ineffective performance range of the input parameters or the output parameters, wherein when there is at least one or any combination of the input parameters and output parameters is within the ineffective performance range, the user interface issues an alarm or stops an operation of the object simulation model.

9. The control simulation system of request item 7, wherein the user interface provides a preferred input range for a manual operation of the at least one control icon in the object simulation model, and the preferred input range is based on the effective performance range.

10. The control simulation system of claim 1, wherein an internal system protocol of the control simulation system is based on one communication protocol of the at least one external device.

11. The control simulation system of item 1, wherein the model interface unit displays the at least one of the plurality of object simulation models.

12. The control simulation system of request item 1, wherein two model interface units corresponding to different external devices, optionally include the same one control icon or the same one physical movable control element, wherein the same one control icon controls different external devices or the same one physical movable control element controls different external devices.

13. A control simulation method, comprising:
transceiving attribute information of a plurality of external devices;
providing at least one object simulation model, configured to correspond to the plurality of external devices according to the attribute information of the plurality of external devices, wherein one of the attribute information is chosen as a common attribute information for all of the plurality of external devices; and
providing at least one physical movable control element or displaying at least one control icon to be flexibly combined with the at least one object simulation model, to form a model interface unit;
wherein, the at least one control icon or the at least one physical movable control element of the model interface unit, corresponds to at least one control command or at least one control structure of the plurality of external devices for controlling the plurality of external devices;
wherein the at least one control icon or the at least one physical movable control element of the model interface unit is shared as a common control icon or a common physical movable control element for at least two of the plurality of external devices.

* * * * *